June 21, 1932.  F. R. ZUMBRO  1,864,396
METHOD AND APPARATUS FOR MANUFACTURING CARBON
DIOXIDE ICE FROM LIQUID CARBON DIOXIDE
Filed Oct. 20, 1928  2 Sheets-Sheet 1
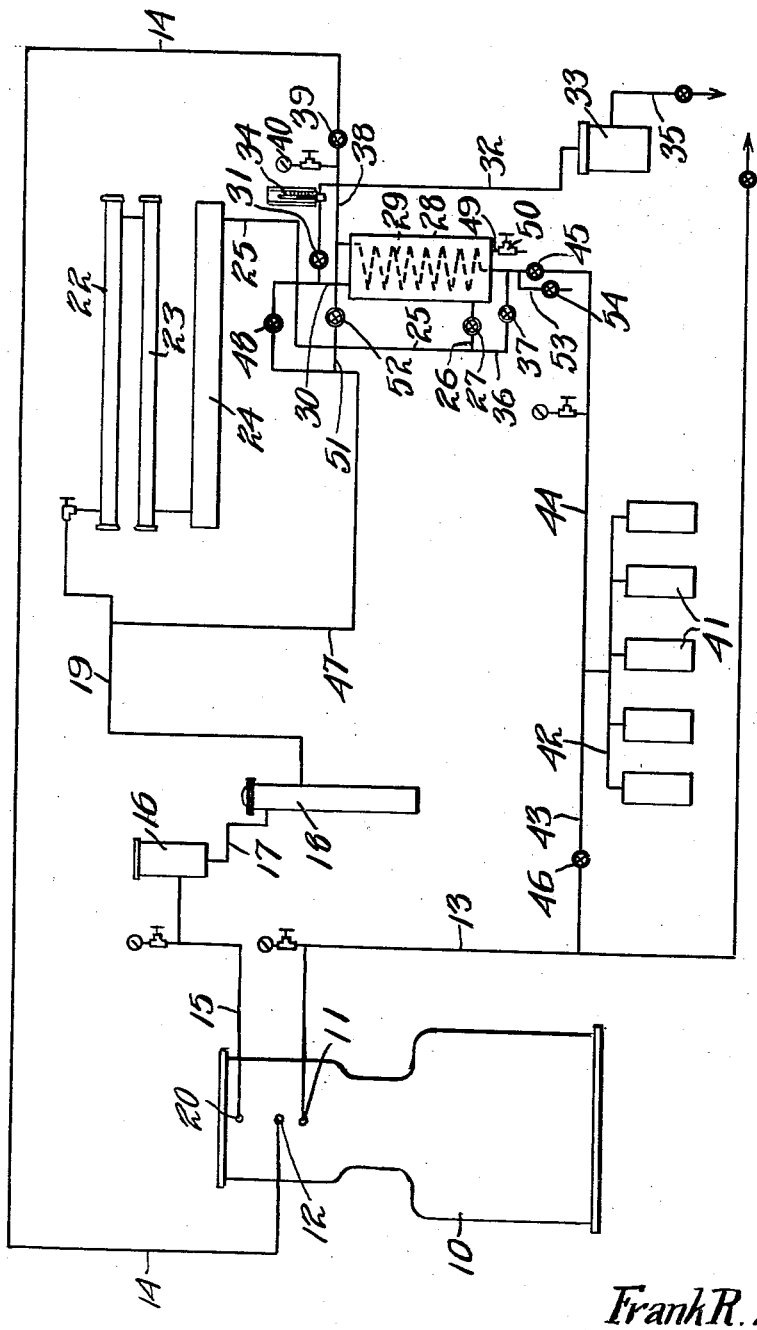
Inventor
Frank R. Zumbro
By [signature]
Attorney June 21, 1932. F. R. ZUMBRO 1,864,396
METHOD AND APPARATUS FOR MANUFACTURING CARBON
DIOXIDE ICE FROM LIQUID CARBON DIOXIDE
Filed Oct. 20, 1928 2 Sheets-Sheet 2
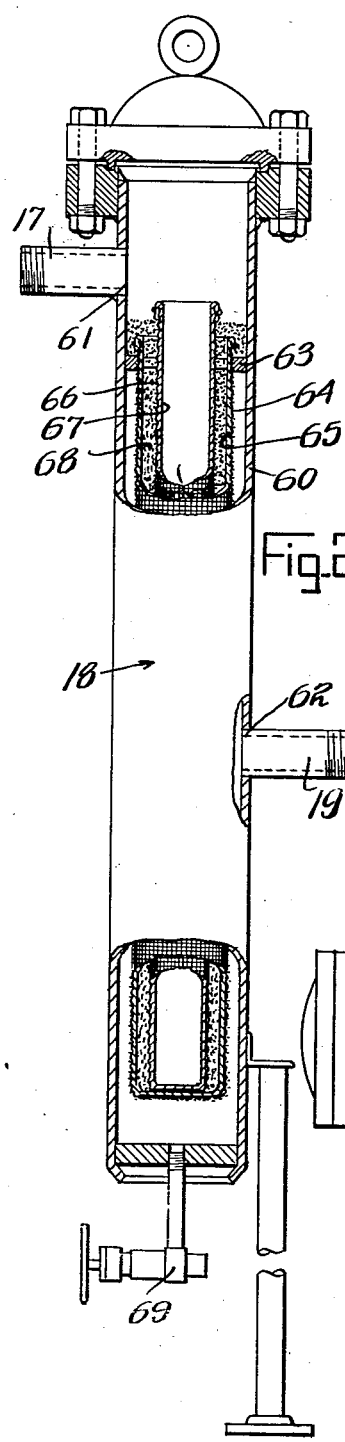
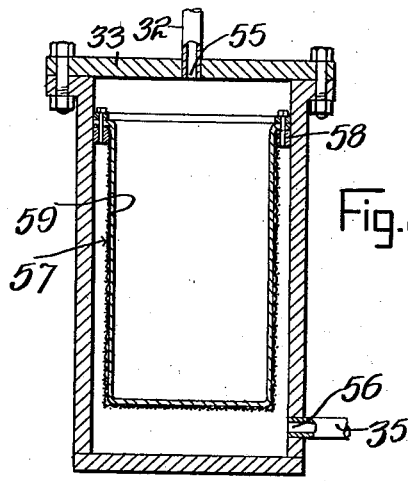
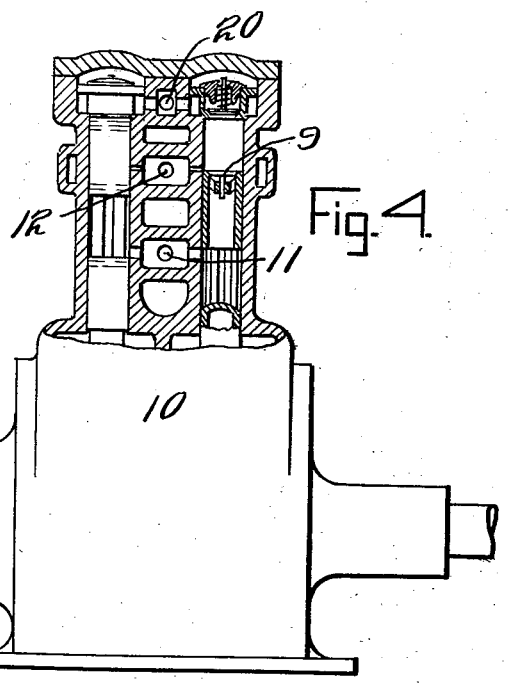
Inventor
Frank R. Zumbro
By
Attorney Patented June 21, 1932

1,864,396

UNITED STATES PATENT OFFICE

FRANK R. ZUMBRO, OF WAYNESBORO, PENNSYLVANIA, ASSIGNOR TO FRICK COMPANY, OF WAYNESBORO, PENNSYLVANIA, A CORPORATION OF PENNSYLVANIA

METHOD AND APPARATUS FOR MANUFACTURING CARBON DIOXIDE ICE FROM LIQUID CARBON DIOXIDE

Application filed October 20, 1928. Serial No. 313,887.

My present invention relates to a method and means for manufacturing carbon dioxide snow or ice from liquid carbon dioxide. In the making of ice cream many manufacturers make their own ice for packing and shipping, the ice plant being an adjunct to the manufacture of ice cream.

An object of this invention is to provide a carbon dioxide snow manufacturing plant which may be operated by the ice cream manufacturer to produce carbon dioxide snow primarily for his own use, but obviously the invention is not limited to plants which manufacture ice cream.

It is a further object of the invention to provide apparatus whereby a manufacturer may buy carbon dioxide in bottles or containers and convert this into solid carbon dioxide, or carbon dioxide snow, as it is frequently called.

A further object of the invention is to provide apparatus in which the carbon dioxide under pressure in the cylinders or containers in which it is purchased may be made to do useful work as it escapes from the containers.

A further object is to provide a system of the kind outlined above, with filtering means by which oil and water may be removed from the carbon dioxide, whereby a clean carbon dioxide ice may result.

Another object is to provide a filter for removing ice from the cold carbon dioxide before it enters the snow machine.

A further object is to provide a system with a compressor operating under both a low and high suction pressure, whereby the pressure of the gas from the carbon dioxide containers may be conserved.

Further objects and advantages will become apparent as the description proceeds.

Referring to the accompanying drawings, which are made a part hereof and on which similar reference characters indicate similar parts, Figure 1 shows the general layout of the system comprising my invention, Figure 2 is a view partly in section, showing details of the gas filter, Figure 3 is a sectional view of the liquid filter, and Figure 4 is a view partly in section showing details of the compressor.

In the drawings, numeral 10 indicates a compressor having suction ports 11 and 12, the port 11 being connected to a source of gas under low pressure through pipe 13, and port 12 being in communication with relatively high pressure gas through pipe 14, as will be more fully described. The structure of the compressor is such that low pressure gas is first drawn into the cylinder on the suction stroke passing through the valve 9 in the piston to fill the cylinder. As the piston reaches the limit of its suction stroke the high pressure port 12 is uncovered and high pressure gas from the pipe 14 enters the cylinder. Upon the compression stroke the mixture of high and low pressure gases is compressed and discharged in the ordinary manner through an outlet port 20 to a pipe 15. The gas passes through the pipe 15 to an oil separator 16. From the oil separator 16 the gas passes through a pipe 17 to a gas filter 18. This gas filter, shown in detail in Fig. 2, consists of a casing 60 having an inlet port 61 and an outlet port 62. Supported on a rib or ring 63 within the casing is a screen 64. This screen is lined with a suitable filtering bag such as canton flannel bag 65. A tubular screen 66 is likewise lined with a filtering bag 67 and is supported within the screen 64 and spaced therefrom. The space between the screens may be filled with a filtering material such as piano felt, asbestos or some other suitable filtering material. The bottom of the casing is provided with a manually operable valve 69 for draining the casing. The gas enters through the pipe 17, passes down within the inner screen and out through the fine screen, the canton flannel bags, the asbestos and out through the surrounding bags and the fine screen, and passes out through the port 62. This filter removes all traces of oil which may have been discharged from the compressor. From the gas filter just described the gas passes through a pipe 19 to a series of condensers 22. These condensers are water cooled and the gas is condensed therein in the ordinary manner. From the condenser the gas passes to a receiver 24. At this point the carbon dioxide is under high pressure and is at approximately the temperature of the water from the condenser. In order to operate economically, it is necessary that the carbon dioxide be cooled to a very low temperature before passing to the snow machine. In order to accomplish this the carbon dioxide is passed through a pipe 25, a branch pipe 26 and a valve 27 to a liquid cooler 28. The carbon dioxide in the liquid cooler is cooled by means of a direct expansion coil 29 which will be subsequently described. From the shell 28 carbon dioxide, now reduced to a very low temperature, passes through a pipe 30, valve 31 and pipe 32 to a liquid filter 33. The filter consists of a casing having an inlet port 55 at the top and an outlet port 56. Between these are placed a screen 57 and suitable filter material. The screen is preferably supported on a ring or ledge 58 within the casing, and is lined with a chamois or suitable cloth bag 59. The carbon dioxide at this point of course is very much colder than the freezing point of water, consequently any water which may have remained in the carbon dioxide will have been frozen. Such water ice particles as are contained in the now liquid carbon dioxide will be deposited in the filter. The cold carbon dioxide liquid passes from the filter through a pipe 35 to a snow machine, wherein it is expanded, such expansion lowering its temperature to form carbon dioxide snow. A thermometer 34 may be placed in the line 32 to indicate the temperature of the fluid as it leaves the cooler 28.

The coil 29 in the liquid cooler is cooled as follows: A portion of the carbon dioxide from the receiver 24 passes from the line 25 through a pipe 36 and an expansion valve 37 into the coil 29 in the cooler. The expansion of the carbon dioxide at this point cools the coil to cool the carbon dioxide surrounding it to a very low temperature. From the coil 29 the carbon dioxide passes through a pipe 38 and a valve 39 to the pipe 14 to the high pressure inlet 12 of the compressor 10. The pipe 38 may have a pressure gage 40 positioned therein to indicate the pressure of the gas as it passes from the coil 29. Similar pressure gages may be positioned in the pipes to indicate the pressure at any point. The valve 39 may be manually operable, however an automatic pressure reduction valve may be used, and may be set so that a desired constant pressure may be maintained in the coil 29. Since the manufactured product is made of carbon dioxide, it is evident that the system must be supplied continuously with carbon dioxide. This is secured from carbon dioxide drums or containers 41. These are connected to a manifold 42 to which are connected pipes 43 and 44. The pipe 44 connects to coil 29 through an expansion valve 45. Carbon dioxide from the pipe 44 is expanded through the valve 45 into the coil 29 from which it passes to the pipe 14 into the high pressure suction side of the compressor. Of course when the system is being charged with carbon dioxide from the tanks 41 the valve 37 is closed. The expansion of the carbon dioxide from the high pressure under which it is contained in the drums acts to cool the liquid cooler 28. The energy stored up in the compressed carbon dioxide in the drums is therefore used in the absorption of heat from the liquid cooler. This adds to the economy of the system. Since the carbon dioxide is expanding into the high pressure port 12 into the compressor all the fluid would not be exhausted from the drums. In order to completely exhaust the drums the pipe 43 is connected by means of a valve 46 with the pipe 13. This connects the drums with the low pressure suction side of the pump so that the carbon dioxide containers may be completely exhausted of their contents when the operator so desires. The pipe 13 is connected to the snow machine so that gas liberated in the snow machine is led to the suction side of the compressor where it is compressed, subsequently liquefied and recirculated through the system. The liquid cooler 28 is preferably designed so that the carbon dioxide may circulate through the shell around the cooling coil 29. The advantages of this is that any water which may be contained in the carbon dioxide will be deposited on the cold coil 29 where it will freeze and consequently will not pass out through the pipe 30 to the snow machine. If the carbon dioxide is passed through a small pipe during the cooling operation water particles contained therein might freeze and stop further circulation. Passing the carbon dioxide through the shell prevents this from occurring. Under certain circumstances it may be found desirable to pass the liquid through the coil to the snow machine and expand the fluid into the shell surrounding the coil. The method is therefore not to be restricted to that shown but is intended to be illustrative only.

Although the structure just described is designed to prevent clogging the system by the formations of ice it may be necessary to further provide for removing ice in case it is formed in the liquid cooler. In order to accomplish this I attach a pipe 47 to the pipe 19. This pipe is connected through a valve 48 and the pipe 30 with the cooler 28. A pipe 49 controlled by valve 50 provides outlet from the shell 28. A branch pipe 51 passes through a valve 52 and is connected to the top of the coil 29. A pipe 53 and a valve 54 provide an exhaust from the coil 29.

The operation of the apparatus just defined is as follows: In order to thaw out the cooler shell the valves 27 and 31 are closed. The valves 48 and 50 are then opened. Warm gas from the pipe 19 then passes through pipe 47 into the cooler 28 and out through the pipe 49 and valve 50. The warm gas from the compressor thaws out the water ice from the shell and blows it out of the system. In order to thaw out any water ice which may be in the coil 29, valves 48, 39, 27 and 45 are closed. Valves 52 and 54 are then opened. Warm gas from the pipe 47 passes through the pipe 51 through the coil 29 and out through the valve 54 to thaw out the coil 29.

While I have shown and described my invention as being used with tanks containing carbon dioxide under pressure, I do not wish to limit myself to this use, as the system may be used with carbon dioxide from any source whatever, even though the carbon dioxide may not be under pressure. When operating in this manner I prefer to admit the gas directly to pipe 13. In this case I may remove the drums 41 and pipes 43 and 44. Furthermore, although I have shown my system as admitting the carbon dioxide from the pressure drums through the cooling system to the compressor, I do not want to be limited to this method, as I may introduce the gas directly into the compressor from the drums. Of course when this method is practiced some of the energy stored up in the compressed carbon dioxide in the drums is wasted.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:—

1. The combination with a plurality of drums containing liquid carbon dioxide under pressure and a compressor having a low pressure and a high pressure suction port, a condenser, a receiver and a liquid cooler, and means for expanding a portion of the liquid from said drums to cool the liquid carbon dioxide in the said cooler and for delivering the expanded carbon dioxide after its passage through the cooler to the high pressure suction port of the said compressor, and means for expanding the residue of the carbon dioxide from said drums to the low pressure suction port of the said compressor, substantially as set forth.

2. The method of compressing and cooling carbon dioxide preparatory to its delivery to a snow machine which comprises compressing, cooling, condensing carbon dioxide, expanding a portion of the liquid carbon dioxide to cool the remainder without appreciably lowering the pressure of the remainder, delivering the expanded carbon dioxide used in cooling the remainder to the intake of a compressor to increase the pressure of and cool the gas in the compressor, substantially as set forth.

3. The method of compressing and cooling carbon dioxide for a snow machine which comprises compressing, cooling, filtering and condensing carbon dioxide gas to form liquid carbon dioxide under high pressure, expanding a portion of this high pressure liquid to cool the remainder while keeping the remainder under high pressure, utilizing the expanded and cooling carbon dioxide to increase the pressure of and cool the carbon dioxide gas in the compressor and supplying the compressor with additional carbon dioxide mixed with cold carbon dioxide gas from the snow machine, substantially as set forth.

4. The method of compressing and cooling carbon dioxide for delivering to a snow making machine which comprises compressing, cooling and condensing carbon dioxide and delivering it to a receiver, expanding liquid carbon dioxide from high pressure containers to cool the liquid carbon dioxide from said receiver and delivering the expanded carbon dioxide to a compressor to increase the pressure of the suction gas in the compressor and to lower the temperature of this gas, substantially as set forth.

5. In a snow making system a multiple effect compressor having two suction ports, one of which is connected to carbon dioxide at low pressure and the other of which is connected to a source of carbon dioxide at relatively high pressure, the low pressure port being connected to a snow machine whereby cold vapors from the said machine are drawn into the compressor on the suction stroke, the other of which is connected indirectly to drums containing liquid carbon dioxide under high pressure, the said liquid passing through a liquid cooler where it is expanded prior to its passage to the said high pressure port, the expansion of the said liquid serving to cool high pressure liquid carbon dioxide from a receiver to which carbon dioxide has been delivered by the said compressor, substantially as set forth.

In witness whereof, I have hereunto set my hand at Waynesboro, Pennsylvania, this 10th day of October, A. D. nineteen hundred and twenty-eight.

FRANK R. ZUMBRO.